United States Patent
Suzuki et al.

(10) Patent No.: US 6,953,914 B2
(45) Date of Patent: Oct. 11, 2005

(54) APPARATUS FOR HEATING BABY FORMULA POT AND METHOD OF OPERATING THE SAME

(75) Inventors: Yoshiyuki Suzuki, Tokyo-To (JP); Sakiko Minami, Saitama (JP); Gen Sato, Iwatsuki (JP); Keiichi Nakamura, Saitama (JP)

(73) Assignee: Combi Corporation, Tokyo-to (JP)

( * ) Notice: Subject to any disclaimer, the term of this patent is extended or adjusted under 35 U.S.C. 154(b) by 0 days.

(21) Appl. No.: 10/956,064

(22) Filed: Oct. 4, 2004

(65) Prior Publication Data

US 2005/0072771 A1 Apr. 7, 2005

(30) Foreign Application Priority Data

Oct. 7, 2003 (JP) .......................... 2003-348659
Oct. 7, 2003 (JP) .......................... 2003-348684

(51) Int. Cl.[7] ................ A47J 31/56; A47J 31/00; A47J 31/44
(52) U.S. Cl. ................ 219/447; 219/432; 219/433; 165/64
(58) Field of Search ................ 219/432, 433, 219/435, 441; 165/64, 65; 62/33

(56) References Cited

U.S. PATENT DOCUMENTS

| 4,591,698 | A | * | 5/1986 | Chang ................ 219/400 |
| 6,591,615 | B1 | | 7/2003 | Luo |
| 6,732,533 | B1 | | 5/2004 | Giles |
| 2003/0074903 | A1 | | 4/2003 | Upadhye et al. |
| 2004/0140304 | A1 | | 7/2004 | Leyendecker |

FOREIGN PATENT DOCUMENTS

| JP | 03-086113 A | | 4/1991 |
| JP | 2004-141675 A | * | 5/2004 |
| JP | 2004-208741 A | * | 7/2004 |

* cited by examiner

*Primary Examiner*—Joseph Pelham
(74) *Attorney, Agent, or Firm*—Birch, Stewart, Kolasch & Birch, LLP

(57) ABSTRACT

An apparatus for heating a baby formula pot 10 includes a case 11, and a heating plate 12 disposed in the case 11 on which a baby formula pot 30 is mounted. When the baby formula pot 30 is mounted on the heating plate 12 and is heated by the heating plate 12, the water contained in the baby formula pot 30 is boiled to become hot water. An water amount is calculated by a control mechanism 35 based on a temperature rising ratio of the water. An optimum cooling period is calculated by the control mechanism 35 based on the calculated water amount. A cooling fan 13 is rotated by the control mechanism 35 in compliance with the optimum cooling period, so that the baby formula pot 30 is cooled by air taken-in through air intake ports 18.

12 Claims, 3 Drawing Sheets

APPARATUS FOR HEATING BABY FORMULA POT AND METHOD OF OPERATING THE SAME

This Non-provisional application claims priority under 35 U.S.C. § 119(a) on Patent Application No(s). 2003-348659 and 2003-348684 filed in Japan on Oct. 7, 2003, the entire contents of which are hereby incorporated by reference.

BACKGROUND OF THE INVENTION

1. Field of the Invention

The present invention relates to an apparatus for heating a baby formula pot and a method of operating the same, by which hot water is quickly prepared for making baby formula in a milk bottle.

2. Background Art

An apparatus for heating a baby formula pot has been conventionally used to prepare hot water for making baby formula in a milk bottle. When using such an apparatus for heating a baby formula pot, a baby formula pot is first filled with water. Then, the baby formula pot is mounted on the apparatus for heating a baby formula pot, and is heated. In this way, hot water is prepared.

In the conventional apparatus for heating a baby formula pot, the water contained in the baby formula pot is boiled in order to remove chlorine from the water. Then, the baby formula pot naturally cools, until the boiled water in the baby formula pot is at a suitable temperature.

However, there is a disadvantage that it takes a relatively long time for the boiled water in the baby formula pot to cool to a suitable temperature.

SUMMARY OF THE INVENTION

The present invention is made in view of the above disadvantage. An object of the present invention is to provide a method of operating an apparatus for heating a baby formula pot, which enables boiled water in the baby formula pot to be readily cooled to a suitable temperature so as to quickly prepare hot water in the baby formula pot.

A method of operating an apparatus for heating a baby formula pot including: a case, a heating plate disposed in the case on which a baby formula pot containing water therein is mounted, a cooling fan disposed in the case for cooling the baby formula pot, and a control mechanism, according to the present invention comprises the steps of: heating the water contained in the baby formula pot by operating the heating plate by means of the control mechanism; cooling the water in the baby formula pot by stopping the operation of the heating plate and by operating the cooling fan by means of the control mechanism; and keeping a temperature of the water in the baby formula pot by operating the heating plate by means of the control mechanism.

In the method of operating an apparatus for heating a baby formula pot, the method further comprises a step of calculating a water amount in the heating step by means of the control mechanism based on a temperature rising ratio of the water contained in the baby formula pot to calculate an optimum cooling period in the cooling step based on the calculated water amount, wherein the cooling fan is operated in the cooling step by the control mechanism based on the optimum cooling period.

In the method of operating an apparatus for heating a baby formula pot, in the step of calculating the optimum cooling period, an optimum water amount pattern is selected by the control mechanism out of a plurality of water amount patterns which are previously determined, based on the temperature rising ratio of the water contained in the baby formula pot so as to calculate the water amount based on the selected water amount pattern.

In the method of operating an apparatus for heating a baby formula pot, in the heating step, a temperature of the baby formula pot is detected by a temperature sensor in contact with the baby formula pot, and a temperature of the water contained in the baby formula pot is calculated by the control mechanism based on a signal sent from the temperature sensor.

In the method of operating an apparatus for heating a baby formula pot, when an anomalous temperature rising of the baby formula pot is detected based on a detection signal sent from the temperature sensor, an operation of the heating plate is immediately stopped by the control mechanism.

An apparatus for heating a baby formula pot according to the present invention comprises: a case; a heating plate disposed in the case on which a baby formula pot is mounted; and a cooling fan disposed in the case for cooling the baby formula pot.

In the apparatus for heating a baby formula pot, the cooling fan is disposed below the heating plate, and an air passage is defined between the heating plate and an inner wall of the case.

In the apparatus for heating a baby formula pot, the inner wall of the case is provided with a heat-resistant cover surrounding the heating plate.

In the apparatus for heating a baby formula pot, the cooling fan is disposed on a base of the case, and the heating plate is fixed above the cooling fan.

In the apparatus for heating a baby formula pot, an air intake port is disposed on the base of the case below the cooling fan.

In the apparatus for heating a baby formula pot, a temperature sensor in contact with the baby formula pot for detecting a temperature of the baby formula pot is disposed on the heating plate.

In the apparatus for heating a baby formula pot, the apparatus further comprises a control mechanism for controlling an operation of the heating plate and the cooling fan.

DETAILED DESCRIPTION OF THE INVENTION

An embodiment of the present invention is described below with reference to the drawings.

Figure 1:
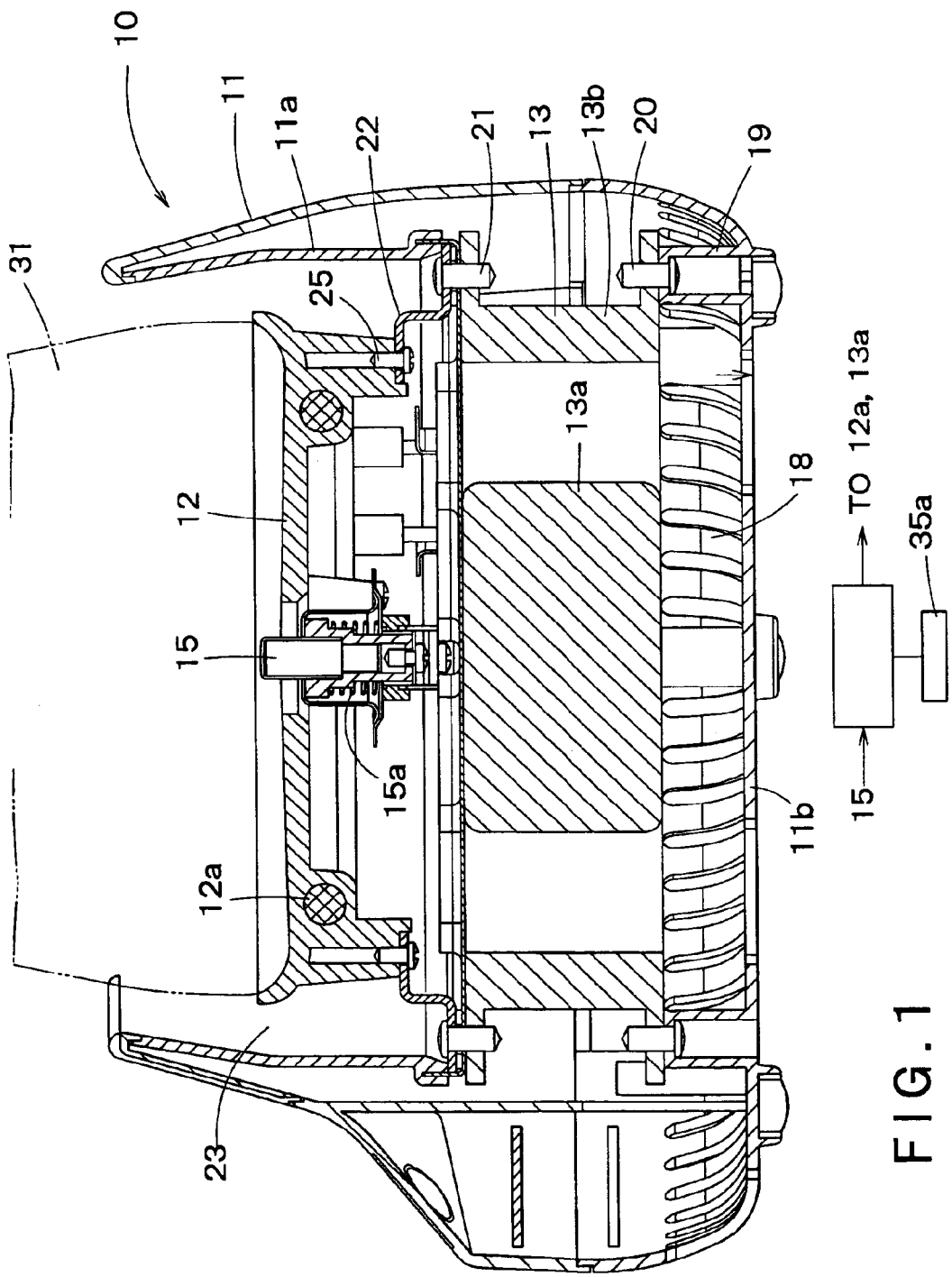
FIG. 1 is a side cross-sectional view showing an apparatus for heating a baby formula pot used in an embodiment of a method of operating an apparatus for heating a baby formula pot according to the present invention.
Figure 2:
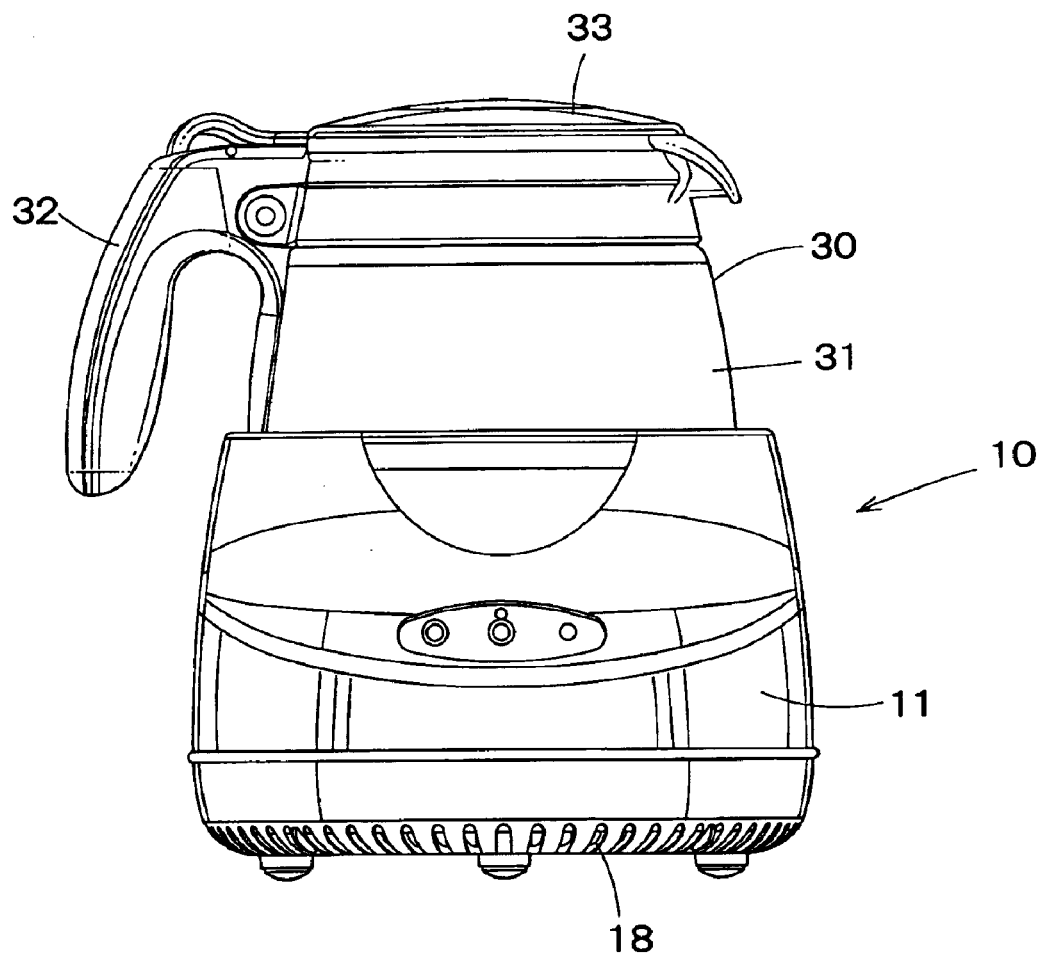
FIG. 2 is a view showing the apparatus for heating a baby formula pot and a baby formula pot.
Figure 3:
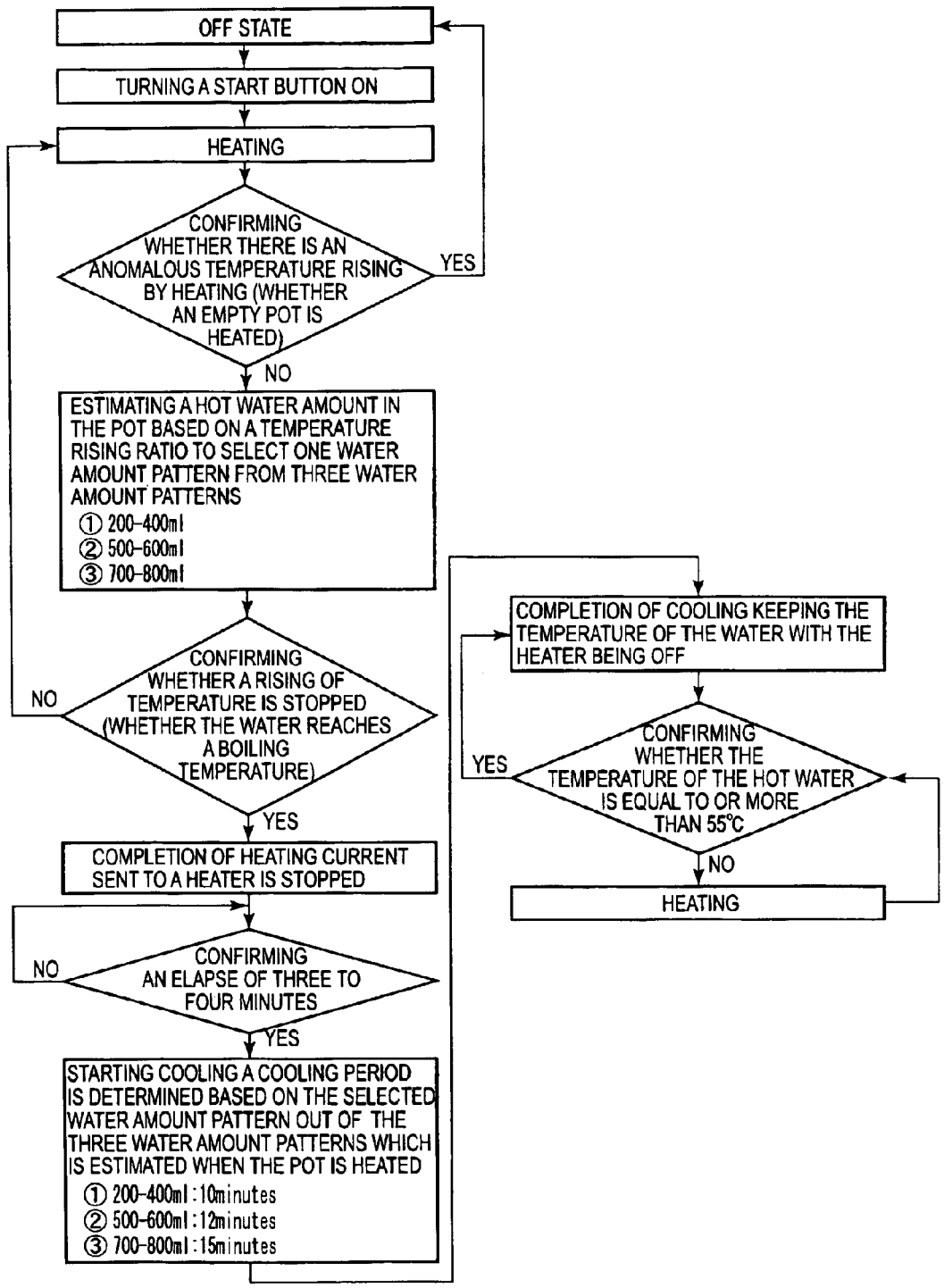
FIG. 3 is a flowchart of the method of operating an apparatus for heating a baby formula pot.

FIGS. 1 to 3 show an embodiment of a method of operating an apparatus for heating a baby formula pot according to the present invention.

As shown in FIG. 2, an apparatus for heating a baby formula pot 10 according to the present invention is used for heating and boiling water contained in a baby formula pot 30 which is mounted on the apparatus for heating a baby formula pot 10.

The baby formula pot 30 includes a pot body 31 made of glass, a cover 33 for openably and closably covering the pot body 31, and a handle 32. Hot water is prepared by boiling water contained in the pot body 31 to remove chlorine from the water. The hot water prepared in the pot body 31 is cooled to have a suitable temperature. Then, the hot water is poured into a not shown milk bottle, and is mixed with a powdered milk in the milk bottle so as to make baby formula.

The apparatus for heating a baby formula pot 10 is described in detail below. The apparatus for heating a baby formula pot 10 includes: a case 11, a heating plate 12 disposed in the case 11 on which the pot body 31 of the baby formula pot 30 is mounted, and a cooling fan 13 disposed in the case 11 for cooling the pot body 31.

An outer body of the case 11 is made of polycarbonate (PC). The case 11 is provided with a heat-resistant cover 11a made of polyphenylenesulfide (PPS) which surrounds the heating plate 12. The heat-resistant cover 11a serves as an inner wall of the case 11. An air passage 23 is defined between the heat-resistant cover 11a and the heating plate 12. A plurality of air intake ports 18 are formed in a base 11b of the case 11.

The cooling fan 13 includes a fan cover 13b and a fan 13a rotatably supported by the fan cover 13b. Outside air is taken in through the air intake ports 18 by rotating the fan 13a. Then, the taken-in air is sent to an outer wall of the pot body 31 through the air passage 23 so as to cool the pot body 31.

The fan cover 13b of the cooling fan 13 is supported by the base 11b of the case 11, and is fixed on a supporting rib 19 of the base 11b by a bolt 20. The heating plate 12 is supported above the fan cover 13b via a supporting member 22 which is fixed on an upper part of the fan cover 13b by a bolt 21 and is fixed on a lower part of the heating plate 12 by a bolt 25.

The heating plate 12 is made of aluminum, and has a heater 12a of nichrome wires buried therein.

A temperature sensor 15 is held on substantially a center part of the heating plate 12 and biased toward the pot body 31 by a spring 15a. When the pot body 31 is mounted on the heating plate 12, the temperature sensor 15 comes in contact with the pot body 31 to detect a temperature of the pot body 31. Then, a temperature of water contained in the pot body 31 is calculated by a control mechanism 35 which is described hereinafter, based on a detection signal from the temperature sensor 15.

An operation of the fan 13a of the cooling fan 13 and the heater 12a of the heating plate 12 is controlled by the control mechanism 35.

A method of operating the apparatus for heating the baby formula pot is described with reference to FIG. 3. The pot body 31 of the baby formula pot 30 is first filled with water, and then the pot body 31 is mounted on the heating plate 12. At this time, the heater 12a and the fan 13a are turned off by the control mechanism 35.

Then, a start button 35a is turned on, so that the heater 12a of the heating plate 12 is turned on by the control mechanism 35. Thus, the heating plate 12 is heated. The heater 12a is, for example, a heater of 700W, and is able to heat the heating plate 12 so that the heating plate 12 has up to about 450° C. At this time, it is confirmed by the control mechanism 35 whether there is an anomalous detection signal sent from the temperature sensor 15. That is, when a temperature of the pot body 31 is anomalously raised by the heat of the heating plate 12, the pot body 31 is judged to be empty (to have no water), and the heater 12a is immediately turned off by the control mechanism 35.

A water amount in the pot body 31 is calculated by the control mechanism 35 based on a temperature rising ratio of the water in the pot body 31. Specifically, an optimum water amount pattern is selected based on the temperature rising ratio of the water out of the following three water amount patterns, such as (1) 200–400 ml, (2) 500–600 ml, and (3) 700–800 ml, which are previously determined. Then, the water amount in the pot body 31 is calculated based on the selected water amount pattern.

When the heating plate 12 is heated by the heater 12a, the pot body 31 is concurrently heated, so that the water in the pot body 31 is boiled to become hot water. When the water is boiled, the heater 12a is stopped by the control mechanism 35. By maintaining such a condition for three to four minutes, chlorine contained in the water can be appropriately removed therefrom.

Thereafter, the fan 13a of the cooling fan 13 is rotated by the control mechanism 35. Then, air is taken in through the air intake ports 18 formed in the base 11b of the case 11. The thus taken-in air through the air intake ports 18 is supplied upward by the fan 13a to pass through the air passage 23 defined between the heating plate 12 and the heat-resistant cover 11a, so that the outer wall of the pot body 31 can be cooled.

As the pot body 31 is cooled by the cooling fan 13, the hot water in the pot body 31 can be cooled to have such a temperature (for example, 55° C.) that is adapted to make baby formula.

An optimum cooling period is determined by the control mechanism 35 based on the three water amount patterns (1), (2), and (3), which are previously determined. The cooling fan 13 is operated by the control mechanism 35 in compliance with the optimum cooling period.

When the water amount is in a range of (1) 200–400 ml, the cooling period is determined to be, for example, 10 minutes. When the water amount is in a range of (2) 500–600 ml, the cooling period is determined to be, for example, 12 minutes. When the water amount is in the range of (3) 700–800 ml, the cooling period is determined to be, for example, 15 minutes.

According to the embodiment of the present invention, since the pot body 31 is forcibly cooled by the cooling fan 13, hot water contained in the pot body 31 can be cooled from its boiling temperature (100° C.) to 55° C. in approximately ten minutes. Since the cooling period when the cooling fan 13 is operated can be optimally determined based on a water amount, the hot water in the pot body 31 can be cooled rapidly to have exactly a desired temperature (55° C.).

Thereafter, a temperature of the water in the pot body 31 is kept about 55° C. by the control mechanism 35 which turns on and/or off the heater 12a based on a signal from the temperature sensor 15.

In the meantime, the baby formula pot 30 is detached from the heating plate 12 as needed. The hot water in the pot body 31 is poured into the milk bottle (not shown), and mixed with a powdered milk to prepare baby formula in the milk bottle.

As above, according to the present embodiment, after the water contained in the pot body 31 of the baby formula pot 30 is boiled to remove chlorine from the water, the pot body 31 is cooled by means of the cooling fan 13, so that the hot water in the pot body 31 can be rapidly cooled to have a suitable temperature (55° C.). Thus, baby formula can be easily and quickly made in the milk bottle.

According to the present invention, after the water contained in a baby formula pot is boiled, the hot water therein can be rapidly cooled to a suitable temperature by cooling the baby formula pot by means of a cooling fan. Therefore, baby formula can be easily and quickly made.

What is claimed is:

1. A method of operating an apparatus for heating a baby formula pot including: a case, a heating plate disposed in the case on which a baby formula pot containing water therein is mounted, a cooling fan disposed in the case for cooling the baby formula pot, and a control mechanism; the method comprising the steps of:

heating the water contained in the baby formula pot by operating the heating plate by means of the control mechanism;

cooling the water in the baby formula pot by stopping the operation of the heating plate and by operating the cooling fan by means of the control mechanism; and keeping a temperature of the water in the baby formula pot by operating the heating plate by means of the control mechanism.

2. The method of operating an apparatus for heating a baby formula pot according to claim 1, further comprising a step of:

calculating a water amount in the heating step by means of the control mechanism based on a temperature rising ratio of the water contained in the baby formula pot to calculate an optimum cooling period in the cooling step based on the calculated water amount, wherein the cooling fan is operated in the cooling step by the control mechanism based on the optimum cooling period.

3. The method of operating an apparatus for heating a baby formula pot according to claim 2, wherein in the step of calculating the optimum cooling period, an optimum water amount pattern is selected by the control mechanism out of a plurality of water amount patterns which are previously determined, based on the temperature rising ratio of the water contained in the baby formula pot so as to calculate the water amount based on the selected water amount pattern.

4. The method of operating an apparatus for heating a baby formula pot according to claim 1, wherein in the heating step, a temperature of the baby formula pot is detected by a temperature sensor in contact with the baby formula pot, and a temperature of the water contained in the baby formula pot is calculated by the control mechanism based on a signal sent from the temperature sensor.

5. The method of operating an apparatus for heating a baby formula pot according to claim 4, wherein when an anomalous temperature rising of the baby formula pot is detected based on a detection signal sent from the temperature sensor, an operation of the heating plate is immediately stopped by the control mechanism.

6. An apparatus for heating a baby formula pot comprising:

a case;

a heating plate disposed in the case on which a baby formula pot is mounted; and a cooling fan disposed in the case for cooling the baby formula pot.

7. The apparatus for heating a baby formula pot according to claim 6, wherein the cooling fan is disposed below the heating plate, and an air passage is defined between the heating plate and an inner wall of the case.

8. The apparatus for heating a baby formula pot according to claim 7, wherein the inner wall of the case is provided with a heat-resistant cover surrounding the heating plate.

9. The apparatus for heating a baby formula pot according to claim 6, wherein the cooling fan is disposed on a base of the case, and the heating plate is fixed above the cooling fan.

10. The apparatus for heating a baby formula pot according to claim 7, wherein an air intake port is disposed on the base of the case below the cooling fan.

11. The apparatus for heating a baby formula pot according to claim 6, wherein a temperature sensor in contact with the baby formula pot for detecting a temperature of the baby formula pot is disposed on the heating plate.

12. The apparatus for heating a baby formula pot according to claim 6, further comprising:

a control mechanism for controlling an operation of the heating plate and the cooling fan.

* * * * *